United States Patent [19]

Hirokawa et al.

[11] Patent Number: 4,855,578
[45] Date of Patent: Aug. 8, 1989

[54] PORTABLE STORAGE MEDIUM PROCESSING SYSTEM

[75] Inventors: Katsuhisa Hirokawa, Yokosuka; Hiroshi Ohba, Tokyo, both of Japan

[73] Assignee: Kabushiki Kaisha Toshiba, Kawasaki, Japan

[21] Appl. No.: 89,999

[22] Filed: Aug. 27, 1987

[30] Foreign Application Priority Data

Aug. 28, 1986 [JP] Japan .................................. 61-199920

[51] Int. Cl.⁴ ............................................. G06K 5/00
[52] U.S. Cl. ...................................... 235/380; 235/382
[58] Field of Search ............... 235/375, 380, 492, 381, 235/494, 437, 382, 382.5, 383; 360/2

[56] References Cited

U.S. PATENT DOCUMENTS

| | | | |
|---|---|---|---|
| 4,197,988 | 4/1980 | Moss et al. | 235/381 |
| 4,528,442 | 7/1985 | Endo | 235/381 X |
| 4,529,870 | 7/1985 | Chaum | 235/380 |
| 4,535,418 | 8/1985 | Stockburger | 235/379 X |
| 4,568,936 | 2/1986 | Goldman | 235/380 |
| 4,650,975 | 3/1987 | Kitchener | 235/380 |
| 4,710,613 | 12/1987 | Shigenaga | 235/379 X |
| 4,745,265 | 5/1988 | Douno et al. | 360/2 X |

FOREIGN PATENT DOCUMENTS 2949351  1/1982  Fed. Rep. of Germany .

*Primary Examiner*—M. H. Paschall
*Assistant Examiner*—A. Jonathan Wysocki

[57] ABSTRACT

When fixed data common to IC cards is written in an unpersonalized IC card, a key card and a fixed data card holding fixed data common to the IC cards are used. When data read/write access is performed among the key and fixed data cards and the unpersonalized IC card, the fixed data is written in the unpersonalized IC card. The data read/write access among the key and fixed data cards and the unpersonalized IC card is performed by a microprocessor and a read/write controller. The data read/write access among the key and fixed data cards and the unpersonalized IC card can be performed without going through a host processor.

21 Claims, 16 Drawing Sheets

| | |
|---|---|
| 61 — | CONTROL PROGRAM |
| 62 — | PERSONALIZATION CODE |
| 63 — | TERMINAL ACCESS CODE |
| 64 — | CARD ACCESS CODE |
| 65 — | PIN |
| 66 — | USER'S NAME / CODE |
| 67 — | ISSUER'S TEMPORARY PIN |
| 68 — | ISSUER'S RECORD / ISSUER'S NAME, ISSUER'S CODE, ISSUER'S PIN |
| 69 — | VOID |
| 70 — | ERROR COUNT |
| 71 — | NUMBER OF CARDS TO BE PERSONALIZED |
| 72 — | PERSONALIZATION COUNT / DEFECT COUNT — 73 |
| 74 — | TOTAL PERSONALIZATION |
| 75 — | PERSONALIZATION RECORD / DATE, MANUFACTURER'S SERIAL NUMBER, NUMBER OF PERSONALIZED CARDS, NUMBER OF DEFECTIVE CARDS |

FIG. 7

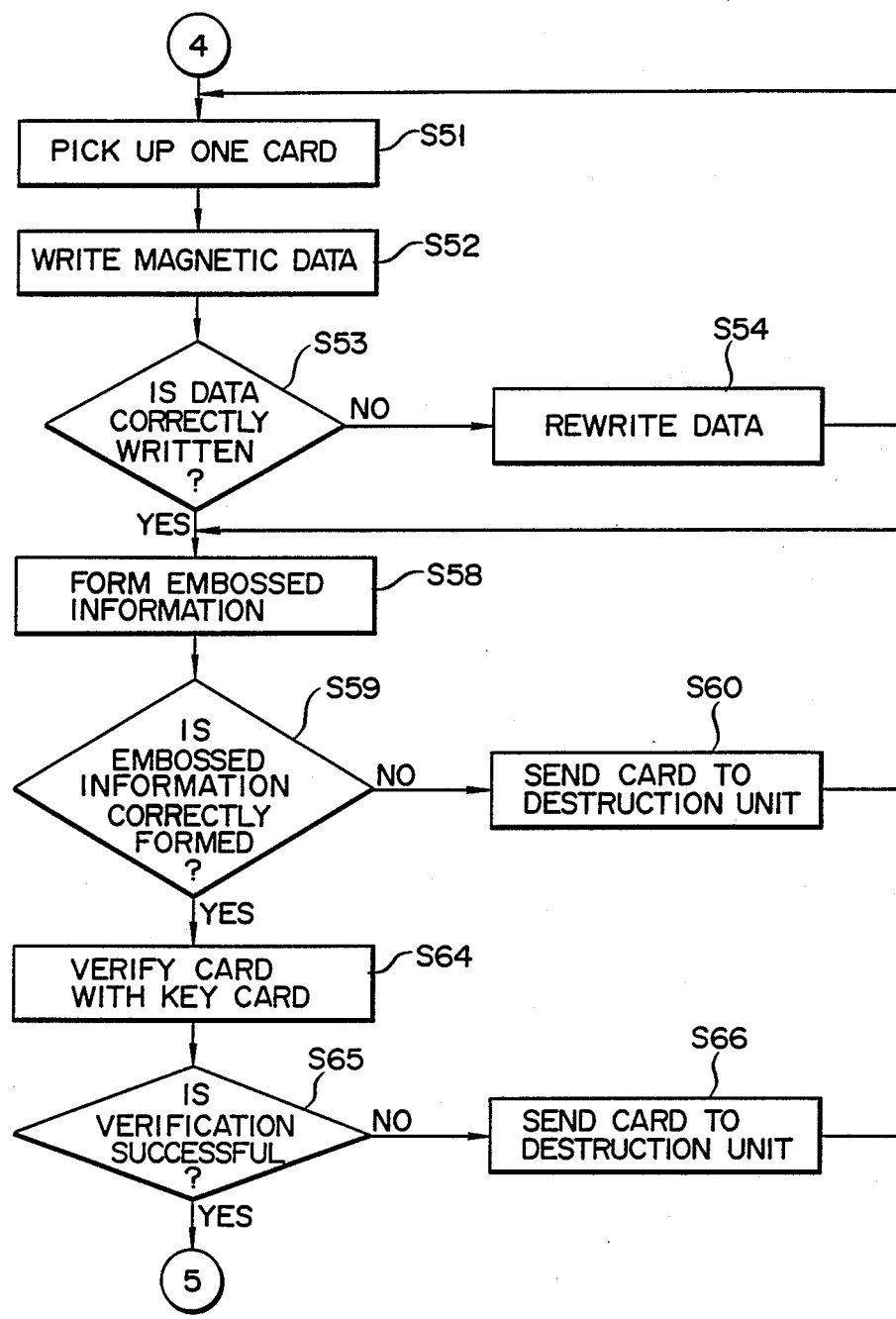
F I G. 10E

FIG. 11

PERSONALIZATION RECORD

X(MONTH) O(DAY), 1986

| PERSON-ALIZATION NUMBER | MANUFACTUR-ER'S SERIAL NUMBER | HOLDER'S NAME | ADDRESS |
|---|---|---|---|
| OOOO | xxxxx | △△△△ | |
| OOOO | xxxxx | △△△△ | |

PORTABLE STORAGE MEDIUM PROCESSING SYSTEM

BACKGROUND OF THE INVENTION

The present invention relates to a portable storage medium processing system, for example, a portable storag medium processing system for personalizing a portable storage medium such as an IC card.

In general, a card with a magnetic stripe, a so-called magnetic card, used as an identification card or a credit card can only store a small volume of data and has poor security since its storage content can be easily read.

Recently, as a portable storage medium, a so-called IC card has been developed which has a large storage capacity, and it can prevent unauthorized access of its storage content. An IC card of this type is delivered from a card manufacturer to a card issuer in an unissued state and is personalized after predetermined data is written therein by the card issuer. Then, the IC card is given to a user.

The conventional IC card is issued in the same manner as that of the conventional magnetic card. More specifically, data recorded in common with respect to all of the card and data different for each card holder are written in advance in a magnetic tape or a floppy disk. These data are read out and the readout data are input to a card reader/writer through a host computer without modification. The input data is written in an unissued IC card by the card reader/writer.

However, in the conventional processing method, data to be written in the IC card may often be disclosed to a third party and therefore the processing system has low security.

SUMMARY OF THE INVENTION

It is an object of the present invention to provide a portable storage medium processing system which is free from the conventional drawbacks and has high security suitable for a portable storage medium with high security.

According to the present invention, a portable storage medium processing system comprises a portable storage medium in which data is to be written, the data including inherent data which is different from that for other portable storage media and data common to other portable storage media, inherent data holding means for holding the inherent data, common data holding means, for holding the common data, interface means with the portable storage medium, read/write control means, arranged between the interface means and the common data holding means, for reading out the common data from the common data holding means and controlling the interface means to write the readout common data in the portable storage medium, and host control means for controlling the read/write control means and reading out the inherent data from the inherent data holding means and supplying the readout data to the read/write control means, and whereby the system writes the common data in the portable storage medium without going through the host control means.

BRIEF DESCRIPTION OF THE DRAWINGS

FIG. 7 is a memory map of a key card;

FIG. 11 is a view showing a print sample of a personalization record.

DETAILED DESCRIPTION OF THE PREFERRED EMBODIMENT

An embodiment of the present invention will now be described with reference to the accompanying drawings.

Figure 1:
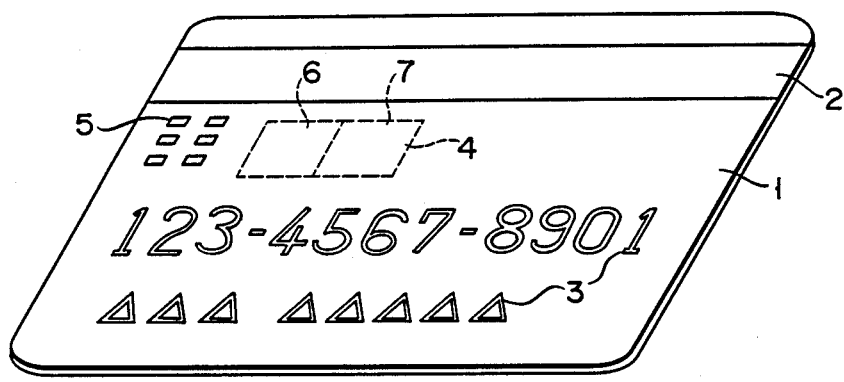
FIG. 1 is a perspective view of an outer appearance of an IC card as an embodiment of a portable storage medium which is personalized by a portable storage medium processing system of the present invention.

FIG. 1 shows the outer appearance of a personalized IC card with a magnetic stripe as an example of a portable storage medium according to the present invention. More specifically, card body 1 is formed of a thin plastic plate having a rectangular shape. Magnetic stripe 2 extending along the longitudinal direction of the card is formed on one side portion of the surface of card body 1. Information 3 is embossed on the surface of card body 1. Embossed information 3 includes identification information of a card holder such as a name, an account number, a validity date, and the like. Contacts 5 serving as I/O terminals which are electrically connected to a card reader/writer (not shown) are formed on the surface of card body 1. Although not shown, contacts 5 are electrically connected to IC (integrated circuit) 4 embedded in card body 1. IC 4 comprises controller (e.g., a microprocessor) 6 and memory (e.g., an EEPROM) 7. Note that before personalization, no embossed information 3 is formed.

Figure 2:
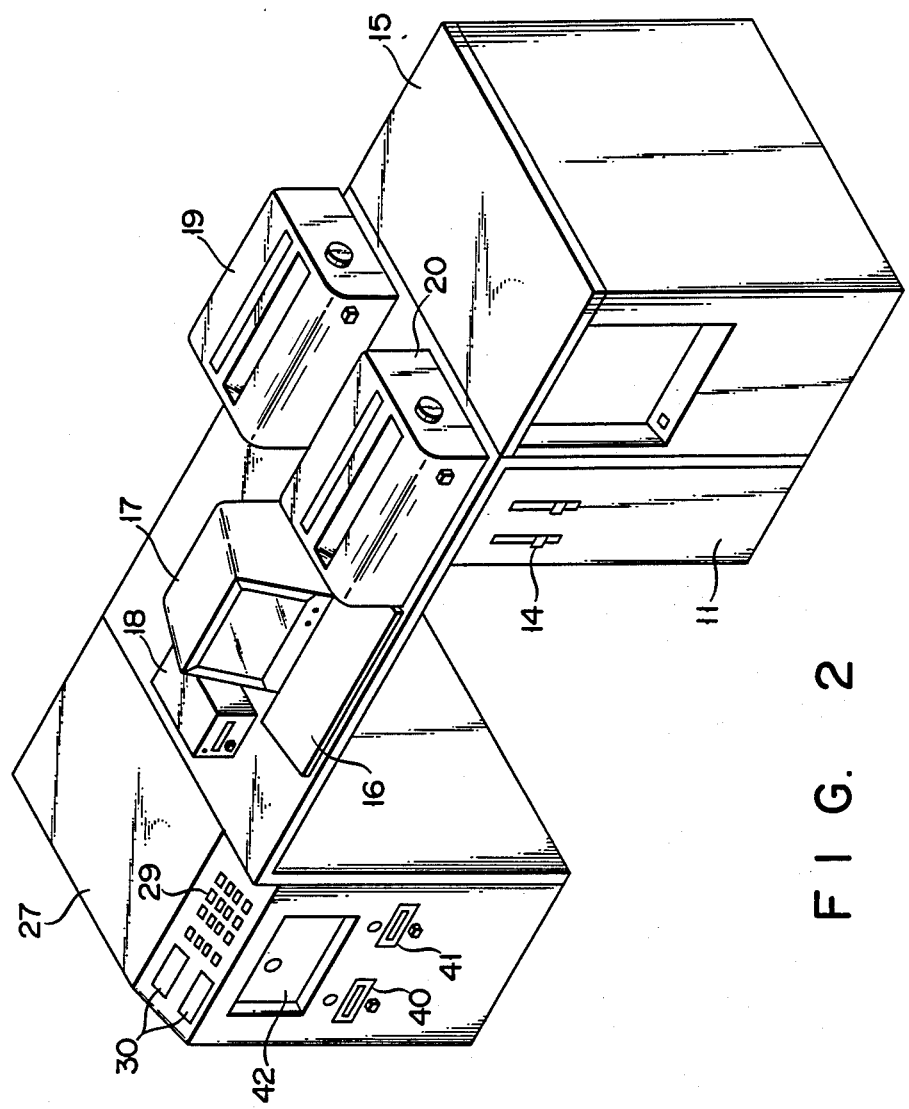
FIG. 2 is a perspective view showing an outer appearance of an IC card processing system as an embodiment of a portable storage medium processing system of the present invention.
Figure 3:
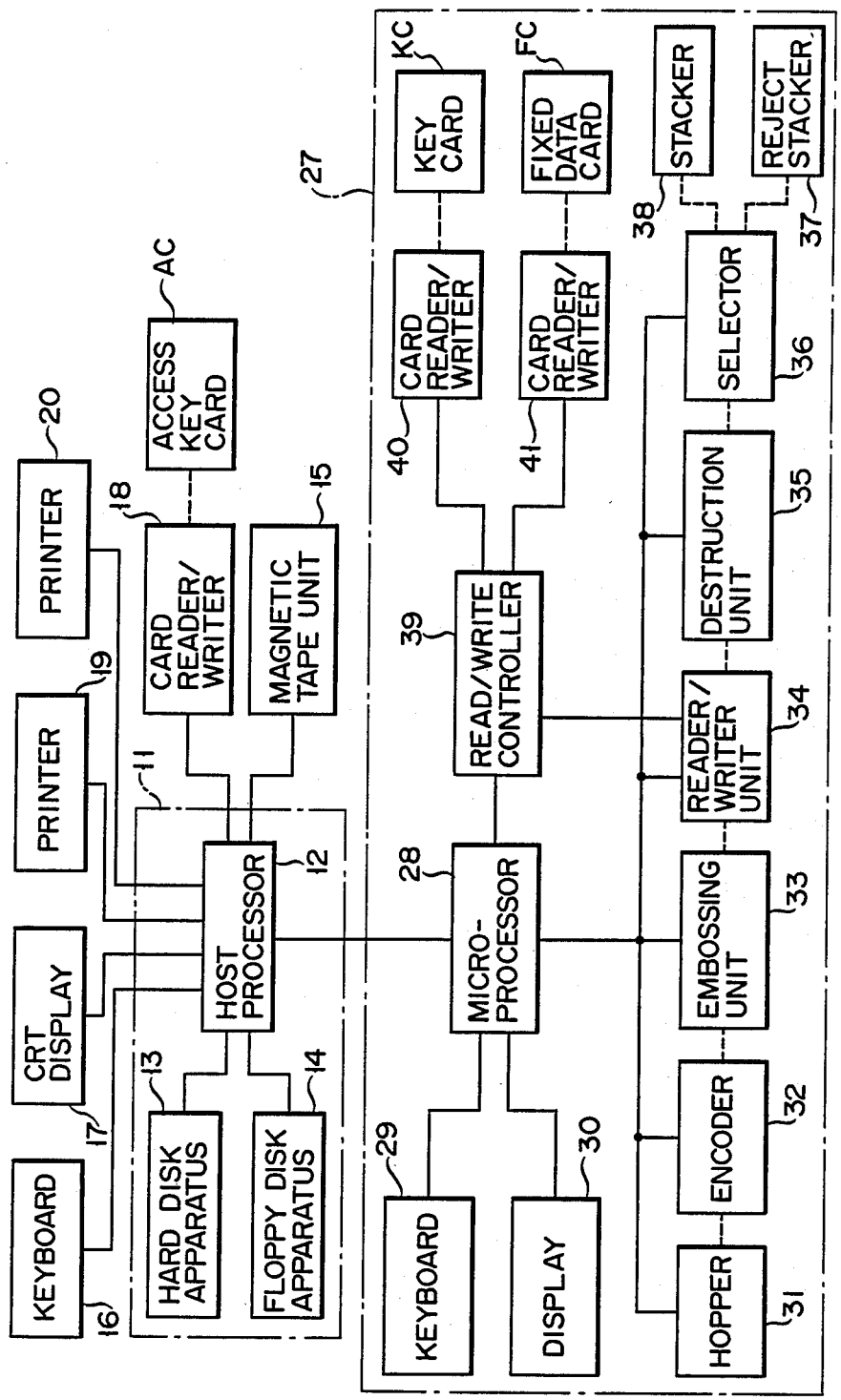
FIG. 3 is a block diagram of the IC card processing system shown in FIG. 2.

FIG. 2 is a perspective view showing the outer appearance of an IC card processing system for personalizing the IC card in accordance with the embodiment of a portable storage medium processing system according to the present invention. FIG. 3 is a block diagram of the system. More specifically, host control unit 11 includes host processor 12, hard disk apparatus 13, and floppy disk apparatus 14, and serves as a host of this system. Host processor 12 includes a controller and a memory storing a control program (neither are shown). Hard disk apparatus 13 stores a program for controlling the entire system and a processed content of this system. Floppy disk apparatus 14 is used for inputting personal data which is different for each IC card as a part of data written in the IC card. The above data includes, for example, a name of a card holder, an account number if the IC card is used as a cash card, and the like.

Host processor 12 is connected to magnetic tape unit 15 for inputting data which is different for each IC card as well as to floppy disk apparatus 14. For example, data extracted from a list of new members registered in a host computer which is recorded on a magnetic tape by a magnetic tape unit of the host computer of a service system of an IC card issuer can be utilized.

Host processor 12 is connected to keyboard 16 for performing various. operations, and CRT display 17 for displaying operation procedures or states. Host processor 12 is also connected to card reader/writer 18. Access key card AC for starting this system can be inserted in card reader/writer 18. As card AC, an IC card similar to that shown in FIG. 1 is used. However, card AC has no magnetic stripe 2 and no embossed information 3.

Figure 4:
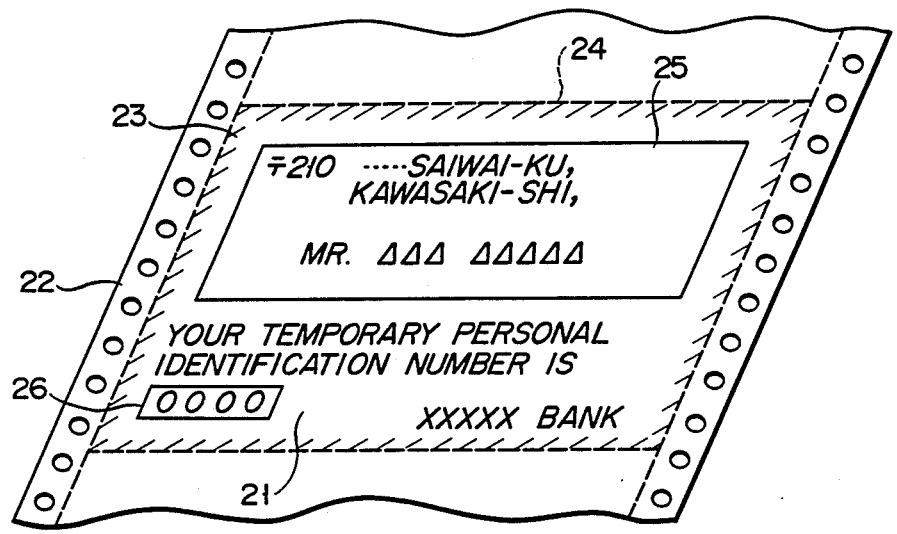
FIG. 4 is a view showing a print sample of a personalization notice of a temporary personal identification number of a card holder.

Furthermore, host processor 12 is connectedto printer 19 for forming a forwarding slip for forwarding an issued IC card to a holder, and printer 20 for forming personalization notice 21 (FIG. 4) for notifying a card holder of his or her temporary personal identification number (PIN) (which can be changed by a card holder himself) separately from the IC card. Personalization notice 21 formed by printer 20 has a format shown in, e.g., FIG. 4. More specifically, personalization notice 21 has an envelope-like shape obtained by adherig side edge portions (hatched portions 23) of duplicate sheets 22. Personalization notice 21 can be cut at perforation 24 formed at the peripheral portion. On notice 21, address & name 25, temporary PIN 26, and the like are printed. In this case, address & name 25 is printed on the first sheet, and temporary PIN 26 is printed only on the front surface of the second sheet (inside the envelope). Thus, the temporary PIN is notified to only a card holder himself.

Host processor 12 is connected to personalization processing unit 27 for processing an IC card to be personalized. Personalization processing unit 27 has microprocessor 28. Microprocessor 28 performs personalization control of an IC card, i.e., control for writing magnetic data in magnetic stripe 2 of the IC card, control for forming embossed information 3 on the IC card, control for writing data in memory 7 of the IC card, and the like. Microprocessor 28 is connected to keyboard 29 and display 30. Keyboard 28 is used for input operations such as a PIN input, a test operation of unit 27, reset upon trouble, and the like. Display 30 displays states of unit 27 and results of the test operation.

IC cards before personalization are stored and stacked in hopper 31, and are picked up one by one in response to a signal from microprocessor 28. An IC card picked up from hopper 31 is sent to encoder 32 for writing magnetic data therein. When microprocessor 28 detects by a sensor (not shown) that the IC card has entered encoder 32, it causes encoder 32 to write magnetic data in magnetic stripe 2 by a read/write head (magnetic head; not shown). After completion of the write access, microprocessor 28 reads the written data, and checks if the data is correctly written. If the written data is correct, microprocessor 28 sends the IC card to embossing unit 33.

However, when the written data is incorrect, magnetic data is rewritten in the IC card, and is again checked. If the data cannot be correctly written again, the IC card is sent to destruction unit 35 through embossing unit 33 and reader/writer unit 34.

Figure 5:
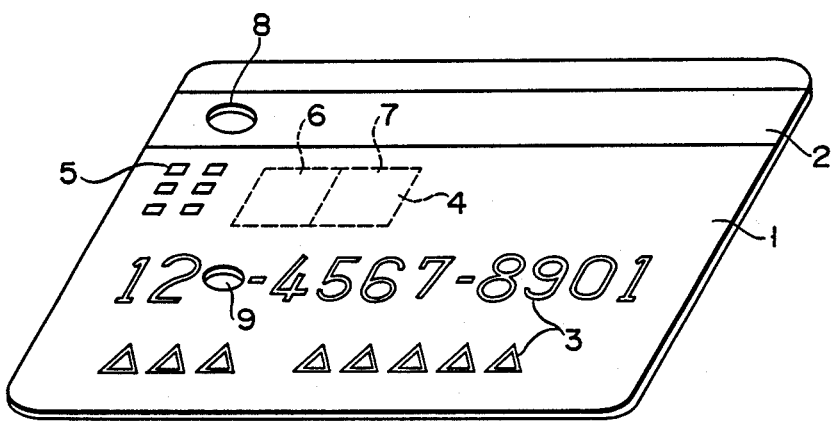
FIG. 5 is a perspective view of an outer appearance of a defective IC card.

Destruction unit 35 forms hole 8 in magnetic stripe 2, as is shown in FIG. 5. Thus, this IC card can no longer be used, and it can be visually decided that this card is a defective card. As will be described later, if embossed information 3 is already formed, hole 9 is also formed in a portion of embossed information 3. As for electrical recording, void data can be written in memory 7 by controller 6 of the IC card so that the IC card can no longer be used. Therefore, destruction such as hole formation need not always be performed. Thus, the destroyed IC card cannot be used in a terminal device in which an IC card of this type can be used, and it can be determined without using special equipment that this IC card cannot be used. Hole formation in the portions of magnetic stripe 2 and embossed information 3 and write access of void data in memory 7 are performed in the following cases.

In a first case, defective magnetic stripe 2 is formed, and an error occurs during formation of embossed information 3 after write access to magnetic stripe 2 is normally completed. In a second case, write access to memory 7 is impossible when embossed information 3 is normally formed and when wrong embossed information 3 is formed (e.g., the last numeral of an account number is embossed with a wrong numeral). In a third case, although magnetic stripe 2 and embossed information 3 are normal, since memory 7 has a defective portion, an IC card cannot be normally operated but some functions of a terminal device in which this IC card can be used are effective.

In the first case, hole 8 is formed in magnetic stripe 2 by destruction unit 35, and void data is written in memory 7 by reader/writer unit 34. Since no embossed information 3 is formed and this IC card has an incomplete appearance, it can be visually determined that this card is a defective card. Therefore, hole formation need not be performed for embossed information 3 by destruction unit 35.

In the second case, since magnetic data is correctly written in magnetic stripe 2 and embossed information 3 is also correctly formed, holes are formed in portions of magnetic stripe 2 and embossed information 3 by destruction unit 35. Since write access to memory 7 is impossible, void data need not be written by reader/writer unit 34 (rather, the void data itself cannot be written therein).

In the third case, holes are formed in portions of stripe 2 and information 3 by destruction unit 35, and void data is written in memory 7 by reader/writer unit 34.

After the defective IC card is subjected to the above void processing, it is selected by selector 36 and is stacked in reject stacker 37.

In contrast to this, as described above, an IC card in which magnetic data is correctly written is sent to embossing unit 33. Embossed information 3 is formed on the IC card by embossing unit 33. In this case, upward embossed characters are formed by pressing using character molds (projecting and recessed molds). However, embossed characters can be formed by adhering characters. When embossed information 3 is formed by pressing using the character molds, microprocessor 28 checks the position of press molds for each character, i.e., if embossing is correctly performed for each character. If an embossing error occurs, the above-mentioned void processing is performed. Of course, data associated with embossing is controlled by microprocessor 28.

When embossed information 3 is correctly formed, the IC card is sent to reader/writer unit 34. In this case, the IC card is stopped when its contacts 5 oppose the contact position of reader/writer unit 34. Thereafter, contacts of reader/writer unit 34 are brought into contact with contacts 5 of the IC card under the control of microprocessor 28.

Thereafter, microprocessor 28 inputs a signal indicating this to read/write controller 39. Upon input of this signal, controller 39 powers controller 6 and memory 7 through contacts 5 and sends a start signal (command) thereto Controller 39 receives a response signal from controller 6 of the IC card, and thereafter, writes data from key card KC (to be described later) inserted in card reader/writer 40 connected to controller 39 and from fixed data card FC (to be described later) inserted in card reader/writer 41 and checks the written data. If controller 39 confirms that the data has been correctly written, it supplies a signal indicating this to microprocessor 28.

Upon reception of this signal, microprocessor 28 controls reader/writer unit 34 so that its contacts are disconnected from contacts 5 of the IC card. Thereafter, the IC card to which all the write accesses are correctly completed is selected by selector 36 through destruction unit 35 and is stacked in stacker 38 under the control of microprocessor 28.

As key card KC and fixed data card FC, an IC card similar to that shown in FIG. 1 is used. However, these cards have no magnetic stripe 2 and no embossed information 3.

An electronic recording unit, e.g., reader/writer unit 34 for electronic recording is provided at the end of the card flow path. This is because since the embossed information is formed by pressing, data can be written in an IC card whose IC 4 and contacts 5 are not destroyed, and hence, a product check operation can be performed during this embossing operation.

The IC cards in stackers 37 and 38 are picked up from pickup door 42.

Figure 6:
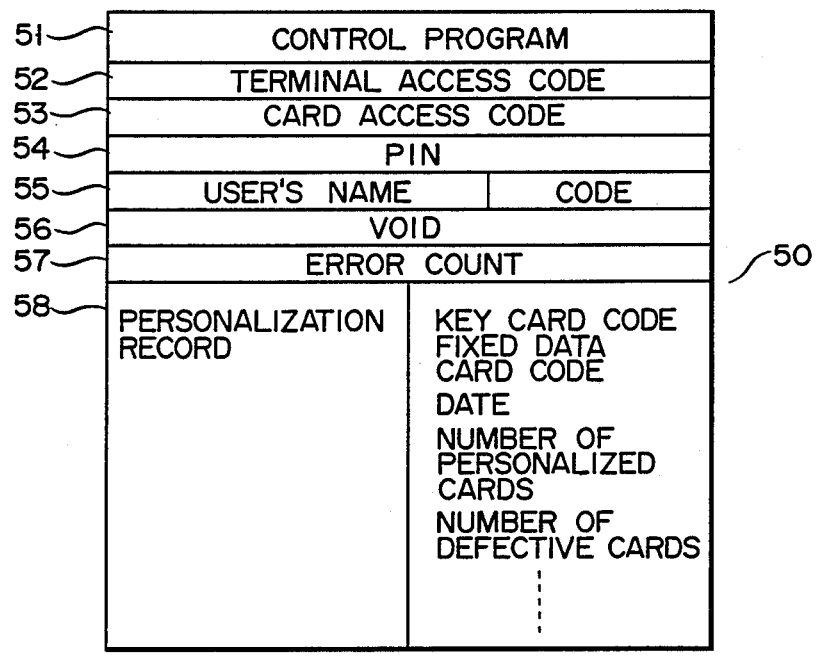
FIG. 6 is a memory map of an access key card.

FIG. 6 shows the content of memory 50 of access key card AC. More specifically, memory 50 includes control program area 51, terminal access code area 52, card access code area 53, PIN area 54, user's name (code) area 55, void area 56, error count area 57, and personalization record area 58.

FIG. 7 shows the content of memory 60 of key card KC. More specifically, memory 60 includes control program area 61, personalization code area 62, terminal access code area 63, card access code area 64, PIN area 65, user's name (code) area 66, issuer's temporary PIN area 67, issuer's record area 68, void area 69, error count area 70, personalization number area 71, personalization count area 72, defect count area 73, total personalization area 74, and personalization record area 75.

Figure 8:
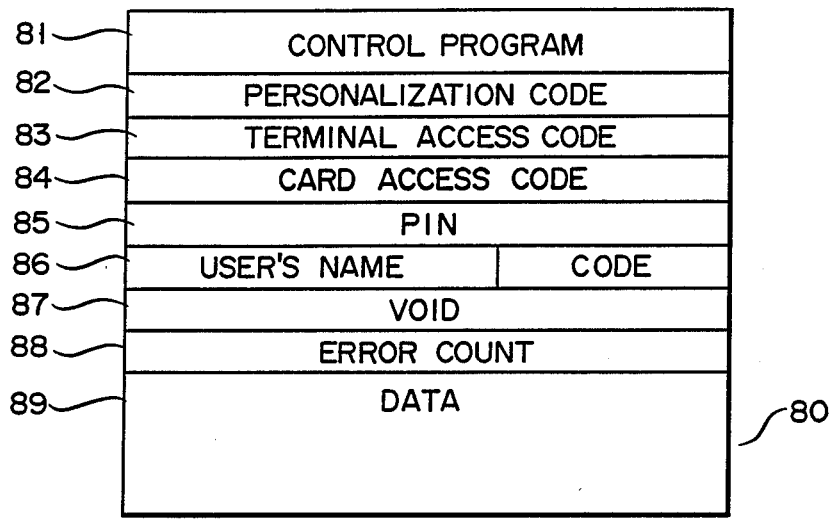
FIG. 8 is a memory map of a fixed data card.

FIG. 8 shows the content of memory 80 of fixed data card FC. More specifically, memory 80 includes control program area 81, personalization code area 82, terminal access code area 83, card access code area 84, PIN area 85, user's name (code) area 86, void area 87, error count area 88, and data area 89.

Figure 9:
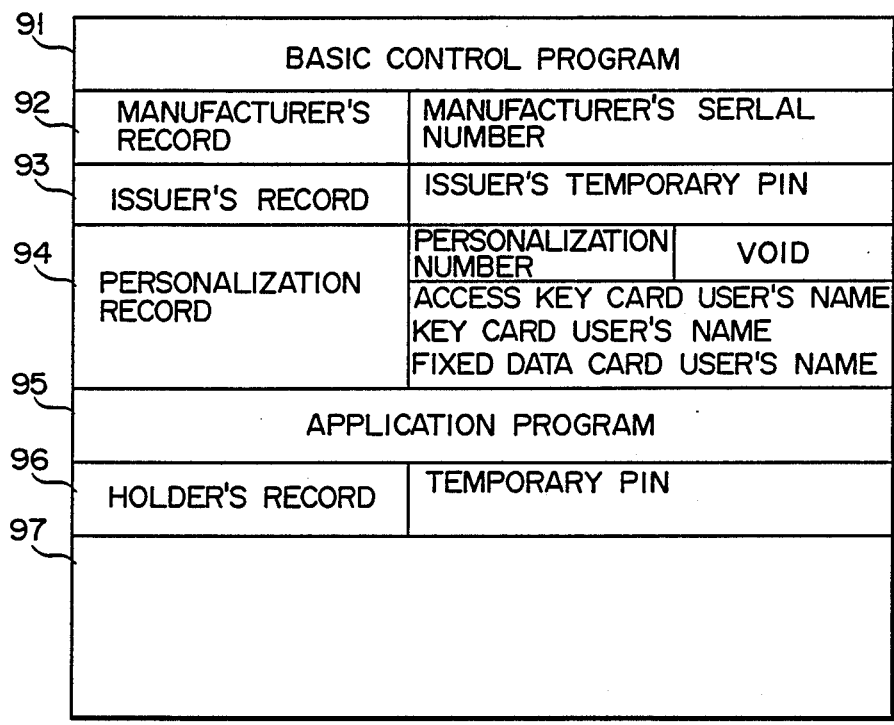
FIG. 9 is a memory map of a personalized IC card.
Figure 10A:
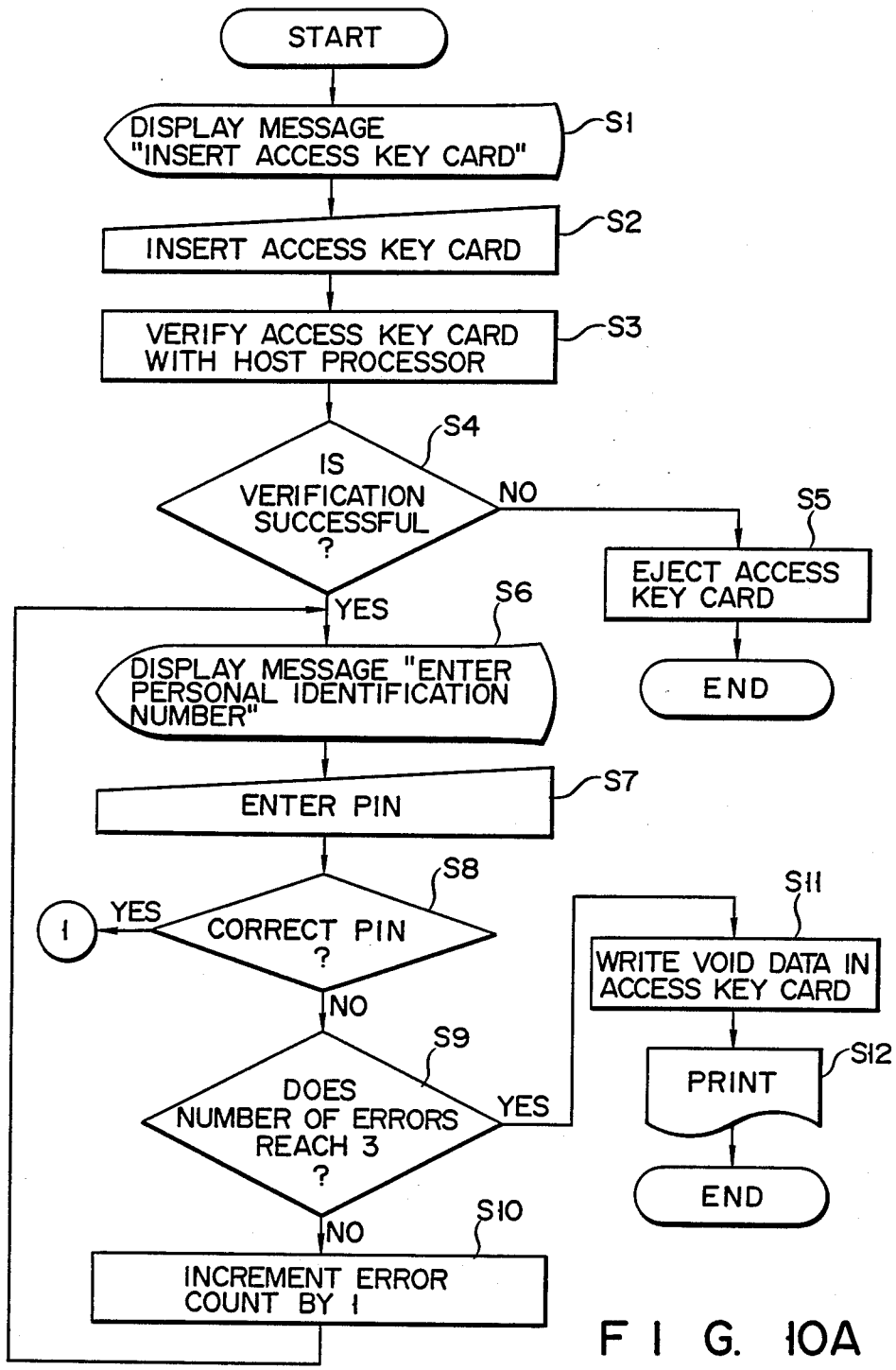
FIGS. 10A to 10I are flow charts for explaining an operation of the IC card.
Figure 10B:
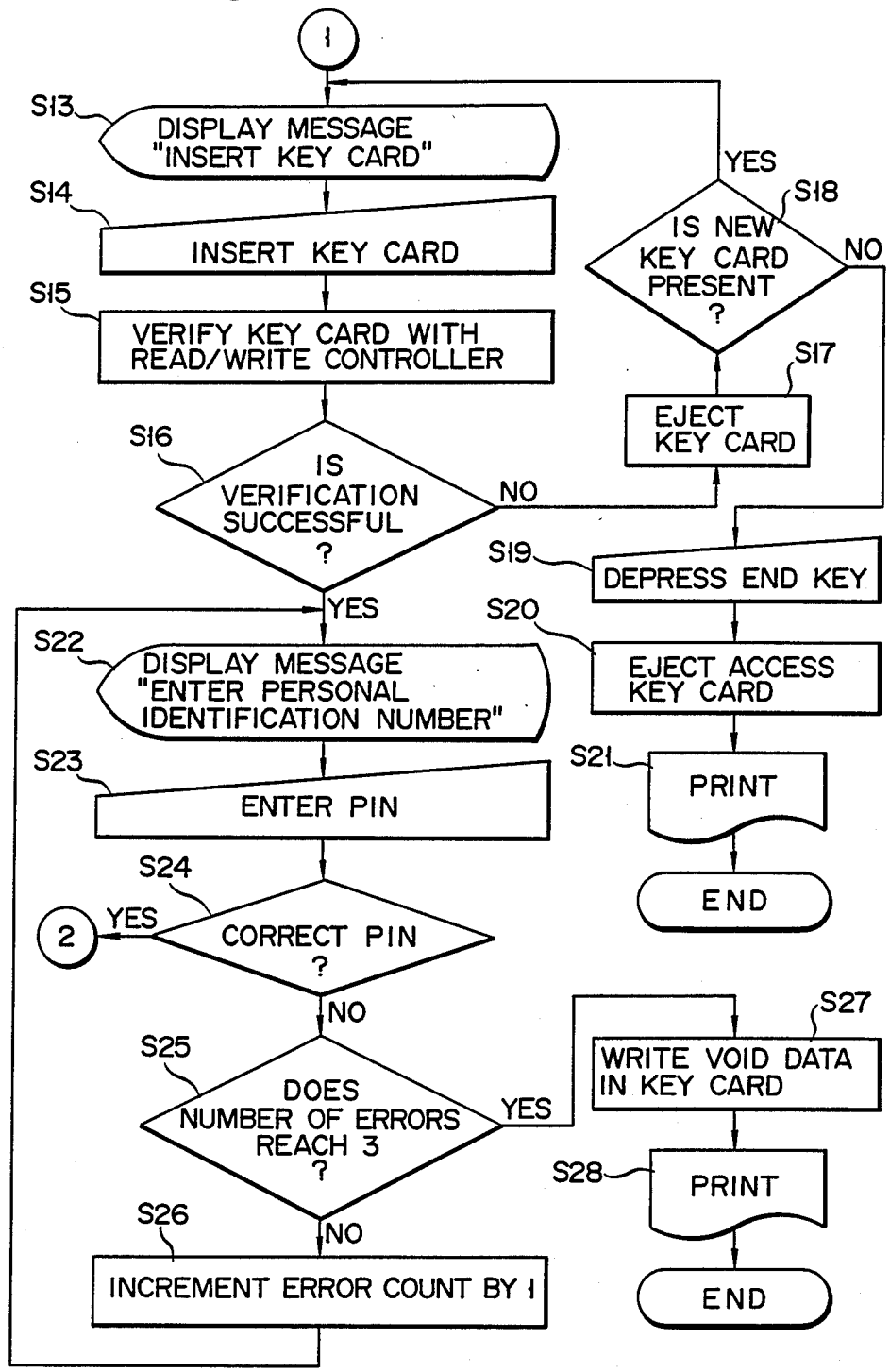
Figure 10C:
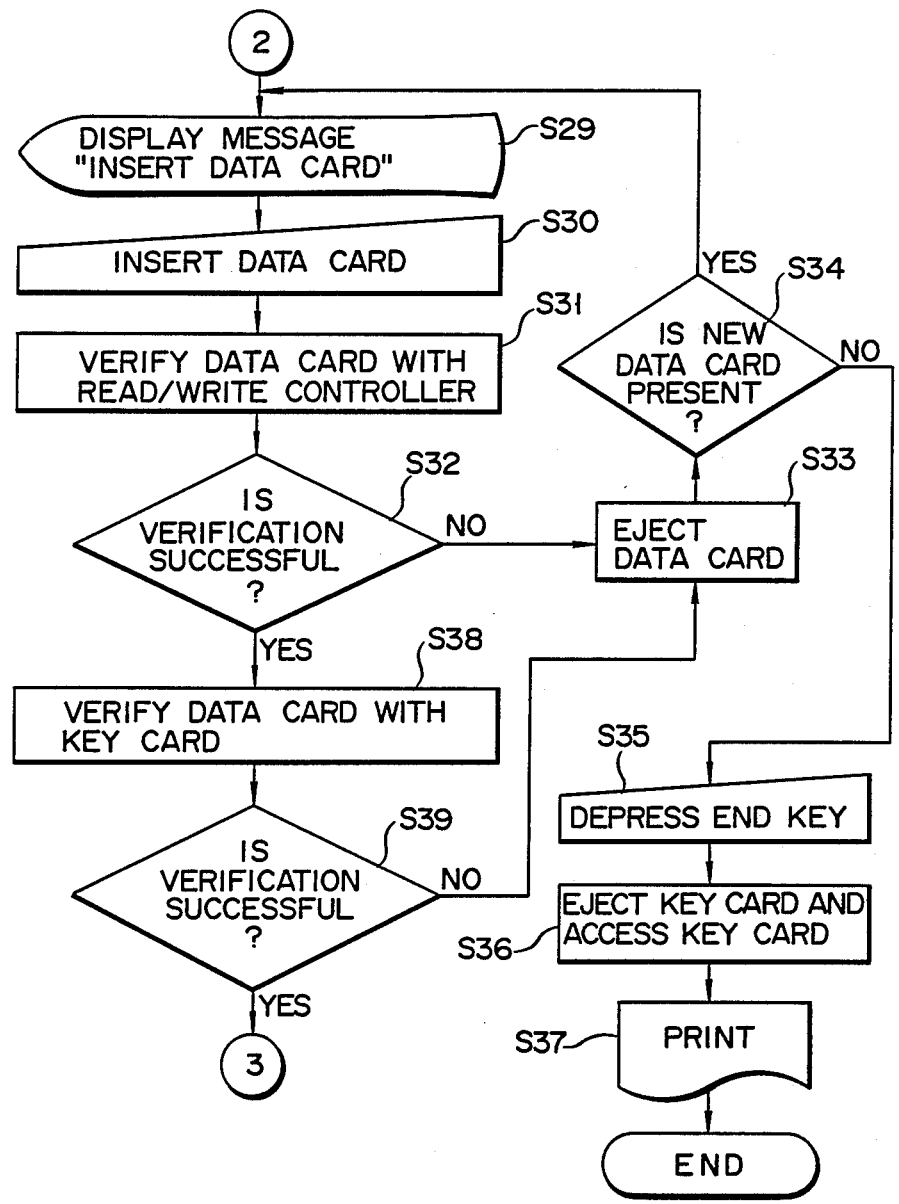
Figure 10D:
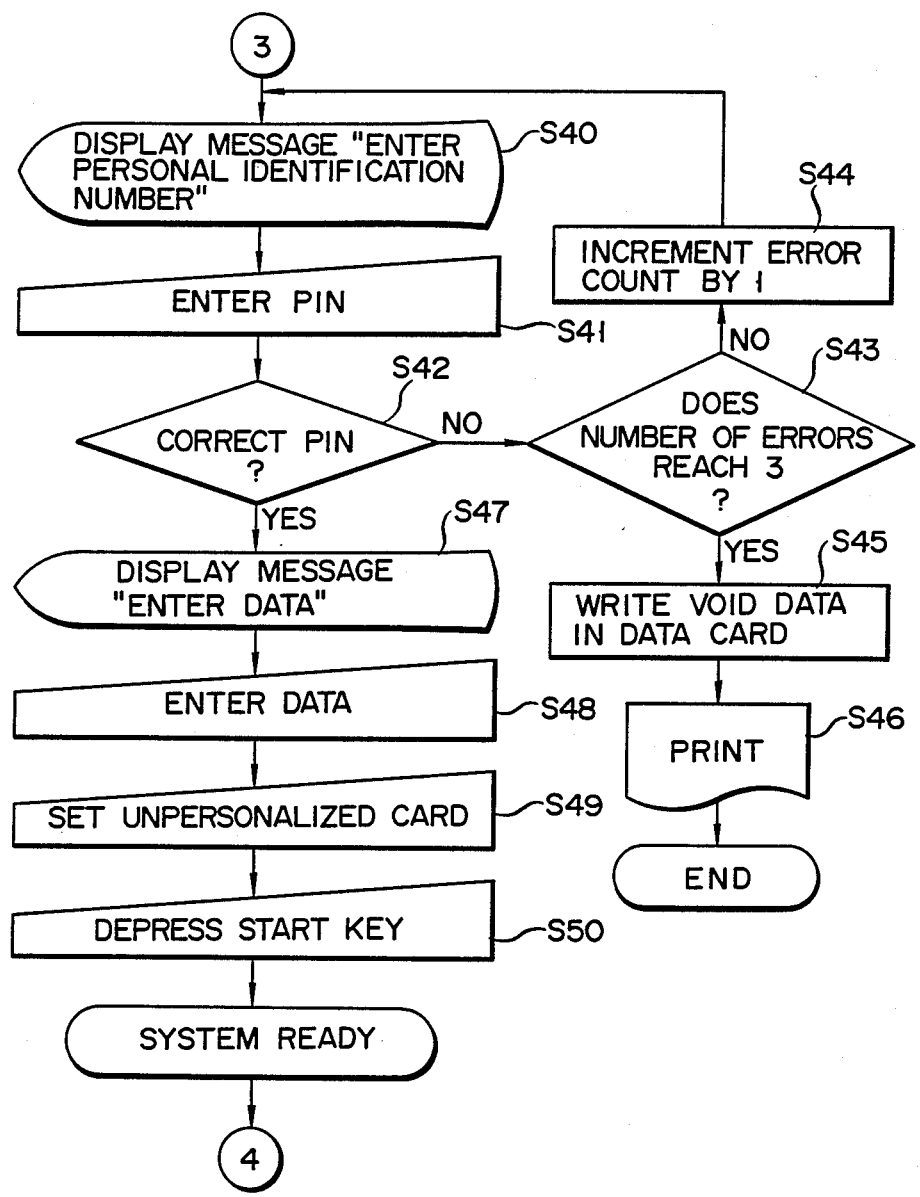
Figure 10F:
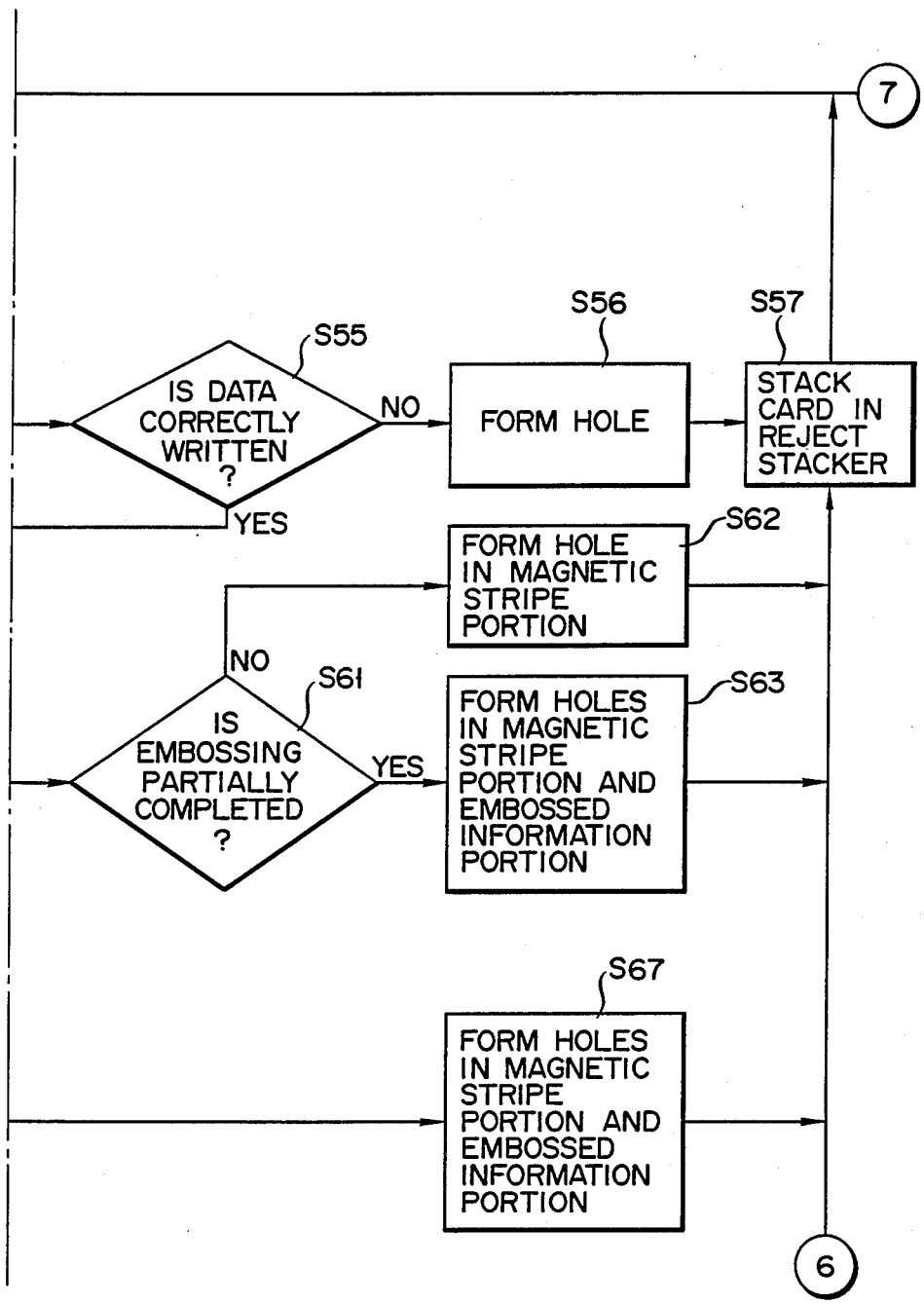
Figure 10G:
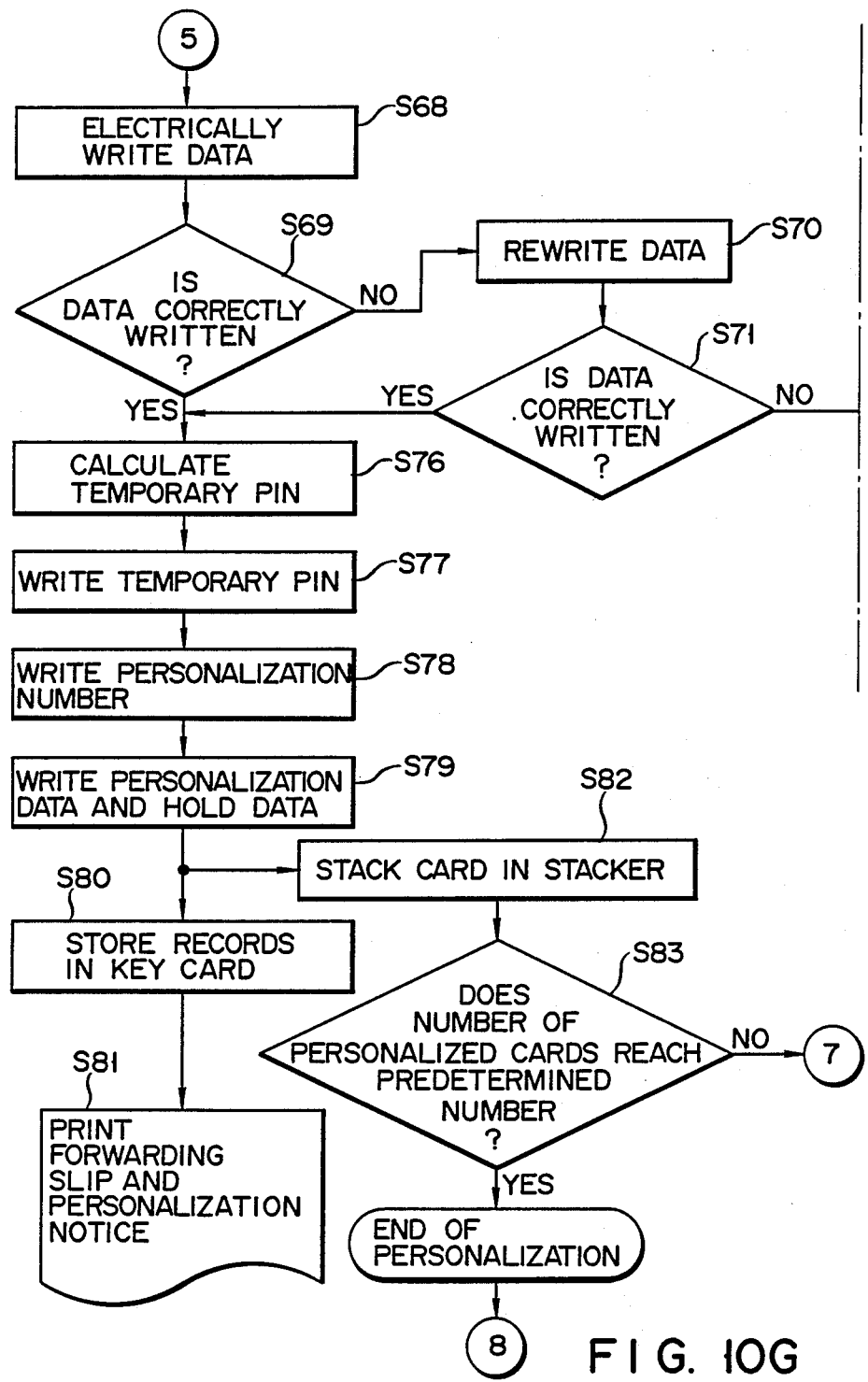
Figure 10H:
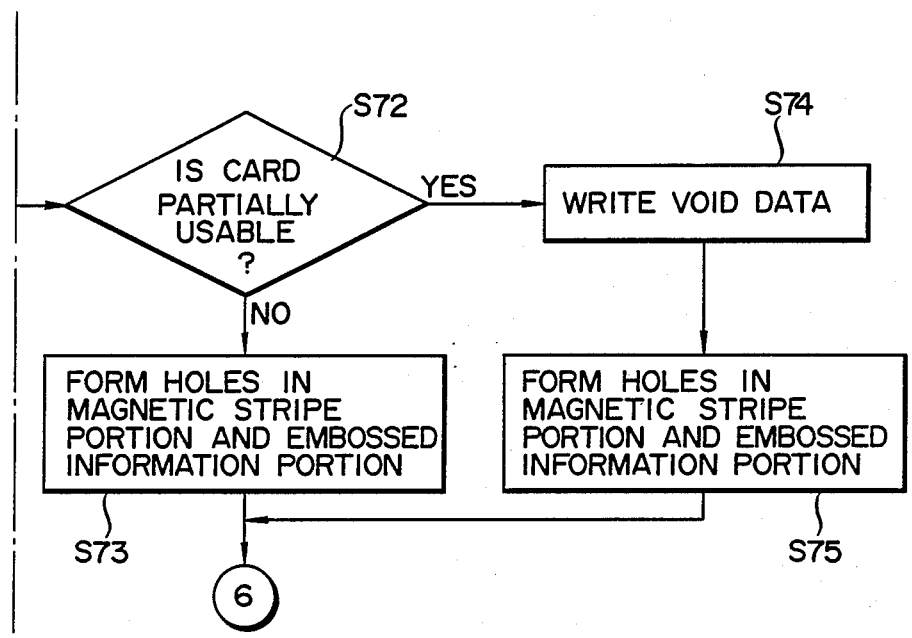
Figure 10:
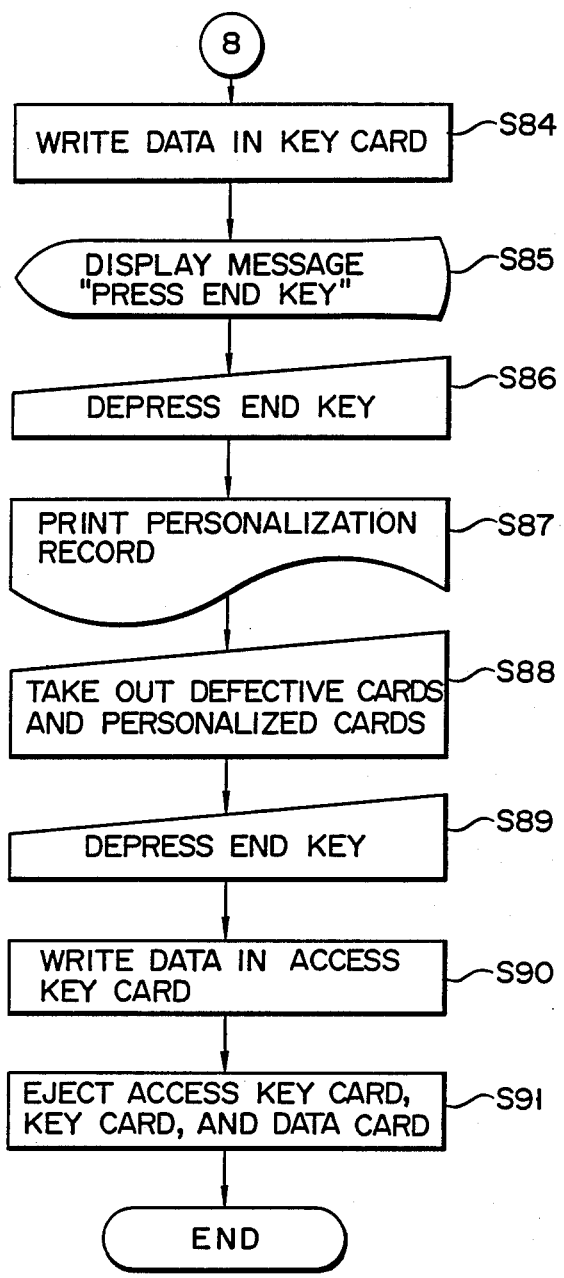

FIG. 9 shows the content of memory 7 of the personalized IC card. More specifically, memory 7 includes basic control program area 91, manufacturer's record area 92, issuer's record area 93, personalization record area 94, application program area 95, holder's record area 96, and empty area 97.

The operation of the system with the above arrangement will now be described with reference to the flow charts shown in FIGS. 10A to 10I.

After this system is powered, host processor 12 performs initialization and, if no problem is present, causes display 17 to display a message "insert access key card" (S1). An operator inserts access key card AC in card reader/writer 18 (S2). Card AC is powered and started, and it is verified if inserted access key card AC is matched with this system (S3, S4).

Matching verification is performed as follows. More specifically, terminal access code area 52 of memory 50 of card AC stores a terminal access code. Host processor 12 requests the terminal access code. Host processor 12 verifies the sent-back terminal access code with a code registered therein. Then, host processor 12 sends a card access code to card AC. Card AC performs verification between the sent card access code and a card access code stored in card access code area 53 by an internal controller (not shown) and the control program stored in control program area 51 of memory 50. However, with any method, it need only be verified that host processor 12 and card AC can access each other.

If verification between processor 12 and card AC is unsuccessful, card AC is ejected from card reader/writer 18 (S5), and processing is ended. If another card AC is used since the wrong card AC is inserted, control must be started from the first step (S1).

If verification between processor 12 and card AC is successful in step S4, processor 12 causes display 17 to display a message "enter personal identification number" (S6). The operator enters a PIN by keyboard 16 (S7). The entered PIN is sent to card AC by processor 12, and verification with a PIN stored in PIN area 54 is performed by the controller and the control program store in control program area 51 of memory 50 of card AC (S8).

If an incoincidence of the PINs is found, error count area 57 of memory 50 is checked (S9). When the control program in area 51 is programmed such that the card AC is voided if the number of times of incoincidence reaches 3, it is checked if the number of times of incoincidence (number of errors) has reached 3. If the number has not reached 3, the content of error count area 57 is incremented by one (S10). A message "wrong personal identification number, re-enter personal identification number" is displayed on display 17, and the flow returns to sep S6. Then, the PIN is re-entered.

If the number of times of incoincidence has reached 3, void data is written in void area 56 of memory 50 (S11), so that corresponding card AC is voided. This operation can be achieved by outputting a void code in place of a terminal access code upon verification between processor 12 and card AC. When card AC is voided as described above, the content of user's name area 55 of memory 50 is read out, and a user's name, a comment of unsuccessful verification, a date, and the like are printed by printer 19 (S12). After the printing operation is completed, the processing is ended. Note that before printing, the user's name is read out from card AC and card AC is ejected from card reader/writer 18.

If a coincidence between the PINs is established, processor 12 causes display 17 to display a message "insert key card" (S13). The operator inserts key card KC in card reader/writer 40 (S14). Then, it is verified in the same manner as in the case of processor 12 and card AC if key card KC and read/write controller 39 can access each other (S15, S16).

If verification between card KC and controller 39 is unsuccessful, card KC is ejected from reader/writer 40 (S17). It is checked if new key card KC is present (S18). If wrong card KC is erroneously inserted, another correct card KC can be re-inserted. If no other card KC is present, an end key of keyboard 16 is depressed (S19). After the content of user's name area 55 of memory 50 of access key card AC is read out, card AC is ejected from card reader/writer 18 (S20). At the same time, the user's name read out from area 55 is printed out by printer 19 together with a date (S21), and the processing is ended after the printing operation.

If verification between card KC and controller 39 is successful in step S16, a signal indicating this is supplied from controller 39 to host processor 12 through microprocessor 28. Upon reception of this signal, processor 12 causes display 17 to display a message "enter personal identification number" (S22). A PIN is then entered by keyboard 29 (S23). In this case, if the PIN is entered not by an operator using corresponding card AC, but by a manager, the security of IC card personalization can be improved. Since the PIN is entered not by keyboard 16 but by keyboard 29 provided to personalization processing unit 27, the security can be improved such that wiring to an external apparatus is unnecessary, thereby preventing any potential wire tapping.

The PIN entered by keyboard 29 is sent to key card KC through controller 39 by microprocessor 28. The PIN is verified with a PIN stored in PIN area 65 by an internal controller (not shown) and a control program stored in control program area 61 of memory 60 of card KC (S24). The verification result is sent from card KC to controller 39, and is then sent to processor 12 through microprocessor 28. Therefore, the verification result (coincidence or noncoincidence) can be displayed not only on display 17 but also on display 30 of personalization processing unit 27. Therefore, for a person who enters the PIN of card KC at unit 27, the enter operation is easy.

If an incoincidence of the PINs is found in step S24, error count area 70 of memory 60 is checked (S25). When the control program in area 61 is programmed such that card KC is voided if the number of times of incoincidence reaches 3, it is checked if the number of times of incoincidence (number of errors) has reached 3. If the the number of times of incoincidence has not reached 3, the content of error count area 70 is incremented by one (S26). A message "wrong personal identification number, re-enter personal identification number" is displayed, and the flow returns to step S22. Then, the PIN is re-entered.

On the other hand, if the number of times of incoincidence has reached 3, void data is written in void area 69 of memory 60 (S27), so that key card KC is voided. This operation can be achieved by outputting a void code in place of a terminal access code upon verification between controller 39 and card KC. When key card KC is voided in this manner, the content of user's name area 55 of memory 50 of card AC and the content of user's name area 66 of memory 60 of card KC are read out, and cards AC and KC are respectively ejected from card reader/writers 18 and 40. At the same time, the user's names read out from areas 55 and 66, a comment of unsuccessful verification, a date and the like are printed by printer 19 (S28). After the above processing, the operation of this system is ended. If this system is to be resumed, control must be started from the first step (S1).

If the PINs coincide with each other in step S24, host processor 12 causes display 17 to display a message "insert fixed data card" (S29) The operator inserts fixed data card FC in card reader/writer 41 (S30). Verification between card FC and controller 39 is performed in the same manner as in checking if controller 39 and card KC can access each other (S31, S32).

If verification between card FC and controller 39 is unsuccessful, card FC is ejected from card reader/writer 41 (S33). It is then checked if new fixed data card FC is present (S34). That is, if wrong card FC is erroneously inserted, another correct card FC can be inserted. If no another fixed data card FC is present, an end key of keyboard 16 is depressed (S35). After the contents of areas 55 and 66 of memories 50 and 60 of cards AC and KC are respectively read out, cards AC and KC are respectively ejected from card reader/writers 18 and 40 (S36). At the same time, the user's names read out from areas 55 and 66, a comment, date, and the like are printed by printer 19 (S37) After this processing, the operation of this system is ended. If the operation is to be resumed, control must be started from the first step (S1).

If verification between card FC and controller 39 is successful, verification between card FC and card KC is then performed (S38, S39) This verification is performed as follows. A personalization code in personalization code area 82 of memory 80 of card FC is read out by controller 39, and is sent to key card KC. Then, card KC verifies the sent code with a personalization code stored in personalization code area 62 of memory 60.

Key card KC and fixed data card FC are used together, and the above verification must be performed. It is effective that cards KC and FC are separately prepared if fixed data cards FC personalized by different issuers can be used in a similar application (e.g., when the oo bank is tied up with the xx bank and card FC can be used in both the banks, the card can be used in the same application). In this case, a plurality of personalization codes can be stored in personalization code area 82 of memory 80 of card FC, so that key cards KC personalized by different issuers can be coped with. Of course, when all the data of card FC (i.e., data written in an IC card to be personalized) is stored in card KC, this system can be started by only key card KC. In this case, initialization can be performed by keyboard 29 of personalization processing unit 27.

If verification between cards KC and FC is unsuccessful in step S39, the flow advances to step S33 to eject card FC, and the same processing as in the above case wherein verification between card FC and controller 39 is unsuccessful is performed.

If verification between cards KC and FC is successful in step S39, a signal indicating this is supplied from controller 39 to host processor 12 through microprocessor 28. Upon reception of this signal, processor 12 causes display 17 to display a message "enter personal identification number" (S40). A PIN is entered in the same manner as in entry of the PIN of key card KC described above (S41). If this entry is performed not by the operator using access key card AC but by a manager, the security of IC card personalization can be improved.

The PIN input by keyboard 29 is sent to card FC through controller 39 by microprocessor 28 The PIN is verified with a PIN stored in PIN area 85 in accordance with an internal ontroller (not shown) and a control program in control program area 81 of memory 80 of card FC (S42). The verification result is sent from card FC to controller 39, and is then set to processor 12 through microprocessor 28. Therefore, the verification result (coincidence or incoincidence) can be displayed not only on display 17, but also on display 30 of processing unit 27. Thus, for a person who enters the PIN of card FC at unit 27, the operation is easy.

If an incoincidence of PINs is found in step S42, error count area 88 of memory 80 is checked (S43). For example, when the control program in control program area 81 is programmed such that fixed data card FC is voided if the number of times of incoincidence reaches 3, it is checked if the number of times of incoincidence (number of errors) has reached 3. If the number of times of incoincidence has not reached 3, the content of error count area 88 is incremented by one (S44). A message "wrong personal identification number, re-enter personal identification number" is displayed on display 17, and the flow returns to step S40. Then, the PIN is re-entered.

If the number of times of incoincidence has reached 3, void data is written in void area 87 of memory 80 (S45), so that fixed data card FC is voided. This operation can be achieved by outputting a void code in place of a terminal access code upon verification between controller 39 and card FC. When card FC is voided in this manner, the contents of user's name areas 55 and 86 of memories 50 and 80 of cards AC and FC are respectively read out, and thereafter, cards AC and FC are discharged from card reader/writers 18 and 41, respectively. At the same time, the user's name read out from areas 55, the user's name read out from area 86, a comment of unsuccessful verification, a date, and the like are printed by printer 19 (S46). After the above processing, the operation of this system is ended. If the system is to be resumed, control must be started from the first step (S1).

If a coincidence of the PINs is established in step S42, processor 12 causes display 17 to display a message "enter data" (S47). A floppy disk (or magnetic tape) as a file of data which is written in an IC card to be personalized and is different for each IC card is set in floppy disk apparatus 14 (or magnetic tape unit 15) (S48). An unpersonalized IC card is set in hopper 31 of personalization processing unit 27 (S49), and a start key of keyboard 16 is depressed (S50). In this manner, this system is started.

Read/write controller 39 reads out and compares the content of personalization number area 71 of memory 60 of card KC (the number of cards to be personalized which is written in advance by a manager) and the content of personalization count area 72. If the content of area 71 is larger than that of area 72, controller 39 sends a signal indicating this to host processor 12 through microprocessor 28. In response to this signal, processor 12 reads out single personalization data of an IC card from floppy disk apparatus 14, and sends the readout data to microprocessor 28.

Microprocessor 28 causes hopper 31 to pick up a single IC card (S51). When the picked up card reaches encoder 32, microprocessor 28 causes encoder 32 to write the data sent from processor 12 in magnetic stripe 2 of the IC card (S52). After the completion of the write access, microprocessor 28 reads the written data, and verifies the readout data with the data sent from processor 12 stored in microprocessor 28, thereby checking if the data has been correctly written (S53).

If it is determined by this check that the write access is unsuccessful, data is re-written (S54), and the check operation is again performed (S55). If the data is not correctly written upon re-checking, the IC card is determined as a defective card and is sent to destruction unit 35. Hole 8 is formed in the portion of magnetic stripe 2 of the IC card (S56). The IC card with the hole is stacked in reject stacker 37 by selector 36 (S57). This event is recorded in hard disk apparatus 13 by host processor 12. When the defective IC card is stacked in reject stacker 37, the flow returns to step S51, and microprocessor 28 causes hopper 31 to pick up the next IC card.

If it is determined in decision step S53 or S55 that the data is correctly written, the IC card with the magnetic data is sent to embossing unit 33. Embossed information 3 is formed on the IC card under the control of microprocessor 28 (S58). Since embossing is performed by pressing character by character, microprocessor 28 controls embossing while checking a character press position character by character (S59).

When a character is erroneously embossed, the embossing is interrupted, and the IC card is sent to destruction unit 35 as a defective card (S60). The embossed information normally includes at least a number of a holder of the IC card (account number in the bank) and a holder's name. Therefore, the portion of embossed information 3 of the IC card on which one or both of these pieces of information are formed is destroyed so as to prevent illegal use of the card. In this case, since the number of the holder is first embossed, hole 9 is formed in this portion by destruction unit 35. In this case, the state of embossing is discriminated (the interrupt time of embossing is checked by microprocessor 28 at S61), and microprocessor 28 controls hole formation in only the portion of magnetic stripe 2 (S62) or in both the portions of magnetic stripe 2 and embossed information 3 (S63). Thereafter, the IC card with the hole is stacked in reject stacker 37.

After embossed information 3 is accurately formed, the IC card is stopped when contacts 5 face the contact position of reader/writer unit 34. Microprocessor 28 controls reader/writer unit 34 so that its contact portion (not shown) is brought into contact with contacts 5 of the IC card. Thereafter, microprocessor 28 sends a signal indicating contact to read/write controller 39. Upon reception of this signal, read/write controller 39 powers controller 6 and memory 7 of the IC card, and exchanges initial signals therewith (since the basic control program of basic control program area 91 of memory 7 is written during manufacture, initial signal exchange can be performed). After the completion of the initial signal exchange, verification between key card KC and the IC card to be personalized is performed through read/write controller 39 (S64, S65).

This verification is performed using an issuer's temporary PIN. A PIN for delivery from the manufacturer to the issuer is temporarily set in an unpersonalized IC card so as to prevent illegal use of the card by a third party. Since this PIN is necessary only upon delivery of the IC card, an issuer's temporary PIN is utilized after personalization.

The verification using the issuer's temporary PIN is performed as follows. Controller 39 reads out an issuer's temporary PIN stored in issuer's temporary PIN area 67 of memory 60 of card KC, and sends the readout data to controller 6 of the IC card to be personalized. Controller 6 reads out an issuer's temporary PIN written by the manufacturer in issuer's record area 93 of memory 7 (an area in which data such as issuer's name, issuer's code, and the like are written), and verifies the readout data with the issuer's temporary PIN sent from controller 39. If it is determined in this verification that the issuer's temporary PINs do not coincide with each other, the IC card is sent to destruction unit 35 (S66). Since the IC card has already been subjected to write access of the magnetic data and formation of embossed information, holes are formed in the portions of magnetic stripe 2 and embossed information 3 (S67). Thereafter, the IC card with holes is stacked in reject stacker 37 (S57).

If a coincidence of issuer's temporary PINs is established in step S65, fixed daaa is written in issuer's record area 93 and application program area 95, and variable data (name and account number of a holder) which is different for each IC card to be personalized is written in holder's record area 96 (S68).

The write access is performed as follows. Fixed data is read out from data area 89 of memory 80 of fixed data card FC, and is written in memory 7. The content of the fixed data includes an application program to be written in application program area 95, area divisions for personalization record area 94 and holder's record area 96, and the like. After write access of the fixed data is completed, the content of issuer's record area 68 of memory 60 of key card KC is read out and is written in issuer's record area 93 of memory 7. Data read access from cards FC and KC and write access to memory 7 are performed under the control of controller 39. After these data are written, controller 39 writes holder's variable data sent from processor 12 through microprocessor 28 in holder's record area 96 of memory 7.

Upon completion of data write access to memory 7, controller 39 reads out the written data, and verifies the readout data with the data from cards FC and KC and from processor 12, thereby checking the data written in memory 7 (S69). If the data is not correctly written, the data is re-written in memory 7 (S70). If the data write error again occurs (S71) and the IC card can be used in some but not all applications (S72), void data is written in personalization record area 94 of memory 7 (S74).

The IC card with void data or IC card in which void data cannot be written is sent to destruction unit 35 as a defective IC card. Holes are formed in the portions of magnetic stripe 2 and embossed information 3 (S73, S75), and the card is then stacked in reject stacker 37 (S57). Of course, when the defective IC card is sent to reject stacker 37, it is checked, and a signal indicating this is sent to controller 39 through microprocessor 28, thereby incrementing the content of defect count area 73 of memory 60 of key card KC. This operation is also performed when the defective IC cards from encoder 32 and embossing unit 33 are stacked in reject stacker 37. This data is also recorded in hard disk apparatus 13 of host processor 12.

If it is determined in decision step S69 or S71 that the data is correctly written, controller 39 calculates a holder's temporary PIN using a random number (S76), and writes the calculated holder's temporary PIN in holder's record area 96 of memory 7 (S77). Controller 39 reads out a total number of personalized cards from total personalization area 74, increments the readout number by one, and writes it in personalization record area 94 of memory 7 as a personalization number (S78). At the same time, a user's name (or code) is read out from cards AC, KC, and FC, and is written in personalization record area 94 of memory 7. Upon completion of this access, controller 39 writes nonrewritable hold data in basic control program area 91 of memory 7 (S79). With this data, data cannot be rewritten except for a PIN as a holder's temporary PIN and an area for a holder to write necessary information when he used the card. In this manner, the IC card is issued, and is sent to stacker 38 to be stacked (S82).

Controller 39 increments the contents of personalization count area 72 and total personalization area 74 of memory 60 of card KC (S80). After the hold data is written in step S79, processor 12 causes printer 19 to print a forwarding slip (data therefor can be derived from a floppy disk in floppy disk apparatus 14 or a magnetic tape in magnetic tape unit 15), and causes printer 20 to print personalization notice 21 on which the calculated holder's temporary PIN is printed (S81). When the holder's temporary PIN is printed by printer 20, data in controller 39 is erased, thereby improving security of the temporary PIN.

After controller 39 increments the contents of area 72 of memory 60 of card KC, it compares the incremented content with the content of personalization number area 71, thereby checking if the number of personalized cards has reached a predetermined number (S83). As a result of this check, if the number of personalized cards has not reached the predetermined number, a signal indicating this is sent to host processor 12. Microprocessor 28 receives data from processor 12, and thereafter causes hopper 31 to pick up another IC card (S51).

If it is determined in step S83 that the predetermined number is reached (when the incremented content of area 72 coincides with the content of area 71), personalization is ended. Of course, even if data to be personalized still remains in processor 12, personalization is ended.

Note that before the hold data is written in step S79, a manufacturer's serial number (serially numbered card by card by the manufacturer and stored together with a manufacture record) written in manufacturer's record area 92 of memory 7 is read out, and is written in personalization record area 75 of memory 60 of card KC as a manufacture number of the personalized IC card as shown in FIG. 11. Thus, a check operation from the time of manufacture can be performed, and it is advantageous for management.

Upon completion of personalization, controller 39 writes the contents of areas 72 and 73 of memory 60 of card KC in personalization record area 75 together with a date (S84). Thereafter, the contents of areas 72 and 73 are cleared. Since the content of total personalization area 74 corresponds to a total number of personalized cards, it is left unchanged, and serves as a last personalization number.

When the write access is completed, processor 12 causes display 17 to display a message "press end key" (S85). The operator depresses the end key of keyboard 16 (S86). Then, host processor 12 causes printer 19 to print a personalization record stored in hard disk apparatus 13 (S87). As the personalization record, manufacturer's serial numbers read out from the IC card personalized in the order of personalization numbers, names and addresses of holders input by floppy disk apparatus 14 (or magnetic tape unit 15), and the like are printed.

When pickup door 42 of personalization processing unit 27 is opened, defective IC cards and personalized IC cards are taken out from reject stacker 37 and stacker 38, respectively (S88). Since holes are formed in at least the portion of magnetic stripe 2 or in both the portions of magnetic stripe 2 and embossed information 3 of each defective IC card, defective IC cards can be easily discriminated from personalized IC cards.

Thereafter, when the end key of keyboard 16 is depressed again (S89), a personalization date, the number of personalized cards, the number of defective cards, a key card code, a fixed data card code, and the like are written in personalization record area 58 of card AC in the same manner as when the personalization record is written in card KC (S90). Thus, the types and number of cards and their personalization date are recorded. Cards AC, KC, and FC are respectively ejected (S91), and all the operations of this system are completed.

The IC card processing system described above uses key card KC and fixed data card FC which store common fixed data to be written in an unpersonalized IC card, and performs data read/write access among these cards KC and FC and an unpersonalized IC card, thereby writing the fixed data in the unpersonalized IC card. The read/write access among cards KC and FC and the unpersonalized IC card is performed under the control of microprocessor 28 and read/write controller 39. Thus, the data read/write access among cards KC and FC and the unpersonalized IC card can be performed without going through host processor 12. Therefore, data to be written in an unpersonalized IC card cannot easily be disclosed to a third party, and security can be noticeably improved.

The present invention is not limited to the above embodiment, and various changes and modifications may be made. For example, in place of key card KC and card reader/writer 40 therefor, a data holding apparatus comprising a controller and a memory which store data for specifying a user and perform verification therein can be adopted, and can be detachably connected to read/write controller 39. Similarly, fixed data card FC and card reader/writer 41 therefor can be replaced with a data holding apparatus comprising a controller and a memory which store data for specifying a user and perform verification therein, and can be detachably connected to read/write controller 39. A PIN is used as data for specifying a user in key card KC and fixed data card FC. For example, a physical feature such as a user's fingerprint or a signature can be stored, and verification can be performed using this data. In this case, keyboard 29 of personalization processing unit 27 must have a means for inputting a fingerprint or a signature.

In the above embodiment, the case has been exemplified wherein the present invention is applied to the IC card processing system in which predetermined data is written in an unpersonalized IC card to personalize it. However, the present invention is not limited to this. For example, the present invention may be applied to an IC card processing system which writes initial data in an IC card upon manufacture of the IC card.

In the above embodiment, the case has been exemplified wherein a portable storage medium is an IC card with a magnetic stripe. However, the present invention can be applied to an IC card without a magnetic stripe or to an optical memory card, a so-called laser memory card.

According to the present invention as described above, a portable storage medium processing system with high security suitable for a portable storage medium with high security can be provided.

What is claimed is:

1. A portable storage medium processing system which writes data in a first portable storage medium, the data including inherent data which is different from data of other first portable storage media and common data which is common to data of said other first portable storage media, said portable storage medium processing system comprising:
    host means including inherent data holding means for holding the inherent data to be written in said first portable storage medium and inherent data reading-out means for reading out the inherent data from said inherent data holding means;
    common data holding means for holding the common data to be written in said first portable storage medium, said common data holding means including a second portable storage medium; and
    data writing means for writing data in said first portable storage medium, said data writing means including means for receiving the inherent data from said host means, common data reading-out means for reading out the common data from said common data holding means without using said host means, and means for writing the inherent data, received by said receiving means, and the common data, read out by said common data reading-out means, in said first portable storage medium.

2. The system according to claim 1, wherein said data writing means includes first verification means for verifying compatibility with said common data holding means, and
    said common data holding means includes second verification means for verifying compatibility with said data writing means, and whereby
    said data writing means writes the data in said first portable storage medium when verification results from said first and second verification means are successful.

3. The system according to claim 2, wherein
    said data writing means includes means for prestoring first and second access codes,
    said common data holding means includes means for prestoring the first access code and means for prestoring the second access code,
    said first verification of compatibility using the first access, and
    said second verification means includes means for performing verification of compatibility using the second access code.

4. The system according to claim 1, wherein
    said common data holding means includes first user specifying means for specifying a user, and
    said data writing means writes the data in said first portable storage medium after the user is specified by said first user specifying means.

5. The system according to claim 4, further comprising:
    second user specifying means, connected to said host means, for specifying a user, and wherein
    said host means reads out the inherent data from said inherent data holding means after the user is specified by said second user specifying means.

6. The system according to claim 4, further comprising:
    input means, connected to said data writing means, for inputting identification data for specifying a user, and wherein
    said first user specifying means specifies a user by verifying pre-registered identification data with the identification data input by said input means, and
    said data writing means writes the data in said first portable storage medium after the user is specified by said first user specifying means.

7. The system according to claim 1, further comprising:
    verification means for verifying compatibility between said common data holding means and said first portable storage medium, and wherein said data writing means writes the data in said first portable storage medium after said verification means verifies compatibility.

8. The system according to claim 7, wherein said verification means is included in said first portable storage medium.

9. The system according to claim 7, wherein said first portable storage medium includes means for prestoring first identification data,
said common data holding means includes means for prestoring second identification data, and
said verification means collates the first and second identification data to verify compatibility, the verification being successful when the first and second identification data coincide with each other.

10. The system according to claim 9, wherein the first identification data prestored in said first portable storage medium includes a temporary personal identification number written by a manufacturer of said first portable storage medium.

11. The system according to claim 1, wherein said common data holding means is provided as a plurality of second portable storage media, each of said plurality of second portable storage media holding specific data which can be confirmed among said plurality of second portable storage media, and
said data writing means writes the data in said first portable storage medium after it is confirmed by the specific data that said plurality of second portable storage media have a correct relationship therebetween.

12. The system according to claim 1, wherein said first portable storage medium includes an IC card.

13. The system according to claim 1, wherein said second storage medium includes an IC card.

14. A portable storage medium processing system which writes data in a first portable storage medium, said portable storage medium processing system comprising:
common data holding means for holding common data common to other first portable storage media, said common data holding means being provided as a second portable storage medium;
writing means for writing data in said first portable storage medium, said writing means including means for reading out the common data from said common data holding means and means for writing the readout common data in said first portable storage medium; and
host control means for controlling said writing means, whereby said writing means writes the common data in said first portable storage medium without going through said host control means.

15. The system according to claim 14, wherein said reading means includes first verification means for verifying compatibility with said common data holding means, and
said common data holding means includes second verification means for verifying compatibility with said writing means, and whereby
said writing means writes the common data in said first portable storage medium when verification results from said first and second verification means are successful.

16. The system according to claim 14, wherein said common data holding means includes first user specifying means for specifying a user, and
said writing means writes the common data in said first portable storage medium after the user is specified by said first user specifying means.

17. The system according to claim 14, further comprising:
input means, connected to said writing means, for inputting data for specifying a user; and
first user specifying means for specifying a user by verifying pre-registered identification data with the data input by said input means, and wherein
said writing means writes the common data in said first portable storage medium after the user is specified by said first user specifying means.

18. The system according to claim 14, further comprising:
inherent data holding means for holding inherent data different from the data for other first portable storage media; and
means, controlled by said host control means, for causing said writing means to write the inherent data read out from said inherent data holding means by said host control means in said first portable storage medium.

19. The system according to claim 14, further comprising means for recording, in said common data holding means, number data of said first portable storage medium written by said writing means.

20. The system according to claim 19, wherein said recording means records the number data in said common data holding means each time write access of said first portable storage medium is completed.

21. The system according to claim 14, wherein said common data holding means records number data in advance, the number data defining an allowance of the number of first portable storage media to be produced, and further comprising:
means for regulating the number of first portable storage media to be produced within the allowance.

* * * * *